United States Patent [19]

Osteen

[11] Patent Number: 5,042,192

[45] Date of Patent: Aug. 27, 1991

[54] SUPPORT AND CONSUMABLES SUPPORT WITH BARRIER CONTAINER

[76] Inventor: James L. Osteen, 2012 Jeridona, La Marque, Tex. 77568

[21] Appl. No.: 500,690

[22] Filed: Mar. 28, 1990

[51] Int. Cl.$^5$ .......................... A01M 1/10; A01M 1/20
[52] U.S. Cl. ...................................... 43/109; 43/131; 43/132.1
[58] Field of Search ............... 43/109, 122, 131, 132.1; 248/146, 150

[56] References Cited

U.S. PATENT DOCUMENTS

| | | |
|---|---|---|
| 240,391 | 4/1881 | Custer ................................... 43/109 |
| 479,980 | 8/1892 | Gordon ................................. 43/109 |
| 533,017 | 1/1895 | Peeler . |
| 1,552,076 | 9/1925 | Mosier . |
| 1,994,859 | 3/1935 | Langum . |
| 2,167,978 | 8/1939 | Jennerich . |
| 3,441,003 | 4/1969 | Du Mond et al. . |
| 3,995,595 | 12/1976 | Williams . |
| 4,550,525 | 11/1985 | Baker et al. . |
| 4,802,302 | 2/1989 | Alnafissa . |
| 4,953,506 | 9/1990 | Sanders . |

FOREIGN PATENT DOCUMENTS

| | | | |
|---|---|---|---|
| 0225102 | 4/1958 | Australia ............................... | 43/131 |
| 0542018 | 12/1931 | Fed. Rep. of Germany ........ | 43/131 |
| 0182710 | 7/1922 | United Kingdom .................. | 43/109 |

Primary Examiner—Kurt Rowan
Attorney, Agent, or Firm—Guy McClung

[57] ABSTRACT

A support with a shielded barrier container for holding material repellant to crawling creatures (ants, animals, insects, scorpions, etc.) and a consumables support with one or more barrier containers for impeding the movement of ants or other crawling creatures up a column or pedestal of the support to consumables on a tray on top of the support, the barrier container or containers containing repellant material that repels the ants or crawling creatures. In one embodiment in which there are two or more barrier containers, they may be in fluid intercommunication or not. A shield may be provided for shielding a top opening of a barrier container or for holding fumes or vapors emitted from repellant material in a barrier container.

3 Claims, 4 Drawing Sheets

SUPPORT AND CONSUMABLES SUPPORT WITH BARRIER CONTAINER

FIELD OF THE INVENTION

This invention is directed to supports with barriers to ants, crawling creatures, and animals and to supports for consumables, e.g. food and water, and in one aspect to such supports with barriers against ants or other crawling creatures.

DESCRIPTION OF RELATED ART

The prior art teaches a variety of well known supports and supports for consumables, various varieties of foodstuffs for human and animals and various varieties of consumable liquids, water, etc. For example, birdbaths comprising a top bowl for holding water mounted on a pedestal are well known as are lazy-susan rotatable dishes for human food. A lazy-susan usually includes an upper tray or shelf rotatably mounted to a short pedestal. Such dishes are used on tables, drainboards, bars, etc. Various feeders are known for feeding animals, e.g. dogs, cats, cows, which include some type of tray, bowl, or container which may have raised sides or may be mounted on some type of legs, stand, or pedestal.

With all of these apparatuses and devices, it is possible for ants or other crawling creatures to climb up the device and gain access to the edible or potable material held by it.

There has long been a need for such apparatuses and devices in which ants or other crawling creatures are prevented from ascending a support or from gaining access to the consumables. There has long been a need for a support and for a consumables support which has an effective barrier for such creatures and which can employ a variety of substances, e.g. water, insecticide, soap, salt, etc. to thwart the efforts of such creatures to ascend or to gain access to consumables. There has long been a need for such supports in which a container with water, insecticide, salt, soap, etc. is shielded so that foreign objects, e.g. leaves, litter, are prevented from entering the container. There has long been a need for such a support which is adjustable.

SUMMARY OF THE PRESENT INVENTION

The present invention teaches: a support with a barrier container containing material for repelling crawling creatures, with a shield above the barrier container; and to consumables supports which effectively exclude ants or other crawling creatures from consumables supported thereon. In one embodiment a consumables supporting according to this invention has a base, a pedestal member, and a top tray or bowl for supporting consumables. A barrier container suitable for containing a repellant material which repels or kills ants or other crawling creatures is disposed on the pedestal so that an ant or other crawling creature would have to go across the repellant material to proceed up the pedestal to the consumables. In one embodiment a support according to this invention has a two-piece pedestal so that the top tray and the part of the pedestal connected thereto may be removed to permit easy accesss to the barrier container. In another embodiment a downwardly projecting shield is provided above the barrier container which blocks the entry into the barrier container of debris, leaves, litter, etc. which could act to form a bridge across the repellant material.

In one aspect of this invention embodiments are fashioned from relatively slick material on which ants or other crawling creatures find it difficult to move without slipping. In another embodiment the barrier container can have two or more chambers, which may be intercommunicating chambers containing repellant material. In certain embodiments part or all of the device may be made of transparent material to provide visual access to the interior of the barrier container and in certain embodiments a hole or access port in a shield or barrier container can be provided through which repellant material may pass into or from a barrier container.

Embodiments employing a two-piece pedestal may have holes in each piece through which a pin can be placed to maintain the pedestal at a certain height. Shields may be configured and/or disposed to hold fumes or vapors emitted by repellant material.

Supports according to the present invention are like the previously-described consumables supports, but rather than necessarily supporting a tray or shelf with edible or potable material thereon, they are structured to support or to receive a support or leg of another structure, e.g., but not limited to a piece of furniture, e.g. a bed.

It is therefore an object of the present invention to provide a new, unique, useful, effective and nonobvious consumables support which impedes or prevents ants or other crawling creatures from having access to consumables supported thereon.

Another object of the present invention is the provision of such a support which can be adjusted in height.

Yet another object of the present invention is the provision of such supports having a barrier container for containing repellant material which repels or kills ants or other crawling creatures.

A further object of the present invention is the provision of such supports which include a shield for the barrier container so that foreign objects are prevented from entering the barrier container.

An additional object of the present invention is the provision of a multi-chamber barrier container.

Another object of the present invention is the provision of such supports with portions thereof, e.g. barrier container and/or shield, which are transparent.

Yet another object of the present invention is the provision of such supports with access openings through which repellant material can pass for the barrier container.

A further object of the present invention is the provision of such supports in which portions thereof are made from slick material.

An additional object of the present invention is the provision of a shield for holding fumes or vapors emitted from repellant material.

Another object of the present invention is the provision of a support with a barrier container for holding material repellant to crawling creatures and a shield disposed over an upper opening in the barrier container without touching it.

The present invention recognizes and addresses the previously-mentioned long-felt needs and provides a satisfactory meeting of those needs in its various possible embodiments. To one of skill in this art who has the benefits of this invention's teachings and disclosures, further objects and advantages will be clear, as well as others inherent therein, from the following description of presently-preferred embodiments, given for the purpose of disclosure, when taken in conjuction with the accompanying drawings. Although these descriptions are detailed to insure adequacy and aid understanding, this is not intended to prejudice that purpose of a patent which is to claim an invention no matter how others may later disguise it by variations in form or additions or further improvements.

DESCRIPTION OF THE DRAWINGS

So that the manner in which the above-recited features, advantages and objects of the invention, as well as other which will become clear, are attained and can be understood in detail, more particular description of the invention briefly summarized above may be had by reference to certain embodiments thereof which are illustrated in the appended drawings, which drawings form a part of this specification. It is to be noted, however, that the appended drawings illustrate preferred embodiments of the invention and are therefore not to be considered limiting of its scope, for the invention may admit to other equally effective equivalent embodiments.

FIG. 4 is a cross-sectional view of a consumables support according to the present invention.

Referring now to FIG. 1 a consumables support 10 according to the present invention has a column 12 with a top 16 and a bottom 14 and a base 18 connected thereto or formed integrally thereof. Secured to or formed integrally of the column 12 is a barrier container 20 having a bottom 22 and a side wall 24 and containing an amount of repellant material 30 which repels ants or other crawling creatures. A tray 26 is connected to or formed integrally of the top 16 of the column 12. The tray 26 has a raised edge 28. A consumables support 50 shown in FIG. 2 has a bottom column member 52 which has an exterior surface 53, a bottom 54 and a top 56. A barrier container 60 is disposed on the column 52 and has a bottom 62 and a side wall 64. The barrier container 60 contains repellant 70.

Figure 1:
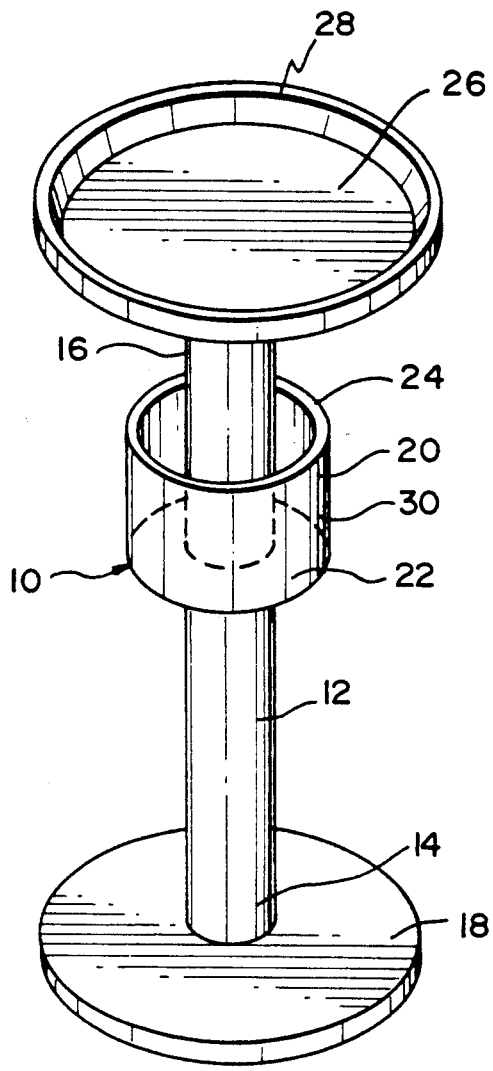
FIG. 1 is a perspective view of a consumables support according to the present invention.

A circular channel 55 in the bottom column member 52 receives and removably holds a circular top column member 51. A tray 66 is connected to or formed integrally with the top column member 51. A shield 72 is connected to or formed integrally with the tray 66. Via a hollow tube 59 mounted in shield 72 repellant material may be introduced into the barrier chamber go without raising the top column member 51.

The shield 72 is cup-shaped and has an opening 74 so that it is disposable about, yet not in contact with, the barrier container 60 when the top column member 51 is inserted into the channel 55 of the bottom column member 52. The top column member 51 is sized so that it is movable up and down within the channel 55 and, since the top column member 51 and the channel 55 are circular, the top column member 51 is rotatable within the channel 55, thus rendering the tray 66 rotatable with respect to the base 58.

When the top column member 51 has been inserted into the channel 55, its downward travel is arrested when a top surface 57 of the channel 55 contacts a bottom surface 67 of the tray 66. The opening 74 in the shield 72 is wide enough that the shield 72 does not contact the side wall 64 in this position; therefore, in this position an ant, e.g., must traverse the distance between the side wall 64 of the barrier container 60 and the exterior surface of the bottom column member 52. The repellant material 70 either prevents the ant from making the attempt or it traps the ant when the attempt is made. The shield 72 is so configured and it is disposable about the barrier container 60 so that if the repellant material emits fumes, or if the repellant material is a liquid and part of it evaporates, the shield 72 will hold some of the resulting fumes or vapors enhancing the repellant atmosphere within the barrier container. It is preferred that the lower end of the shield 72 extend downwardly further than the top edge of the side wall 64 to provide maximum protection of the interior of the barrier container and maximum fume-trapping ability. The shield not only prevents debris, leaves, litter and other foreign objects from entering the barrier container, it also prevents rain or water from sprinklers from entering the container which might dilute or wash out the repellant material.

Figure 3:
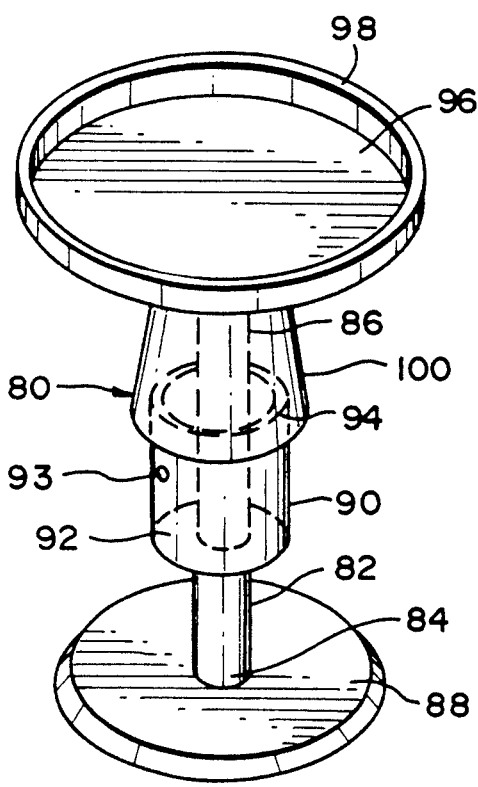
FIG. 3 is a perspective view of a consumables support according to the present invention.
Figure 2:
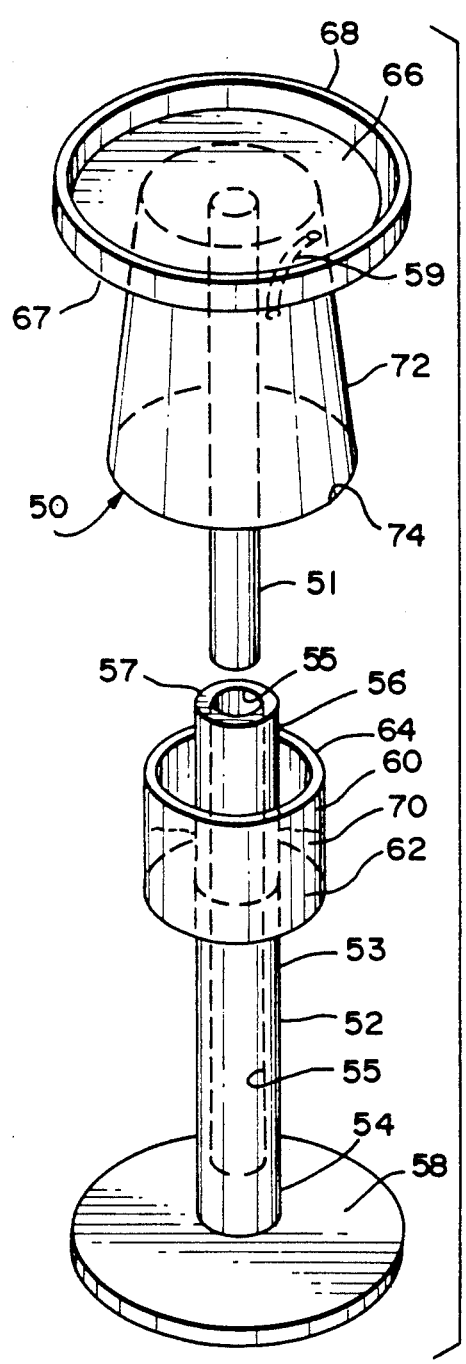
FIG. 2 is a perspective exploded view of a consumables support according to the present invention.

FIG. 3 illustrates another embodiment of the present invention and shows a consumables support 80 which has a column 82, a base 88, and a tray 96 with a raised side wall 98. A barrier container 90 disposed about the column 82 has a bottom 92 and a side wall 94. An opening 93 on the side wall 94 permits repellant material to be inserted, poured, or fed into or out of the barrier container 90. A shield 100 connected to the tray 96 (or to the column 82) is disposed about the barrier container 90, but does not contact it.

FIG. 4 illustrates a consumables support 110 according to the present invention which has a base 118 from which a circular bottom column 112 extends upwardly. A barrier container 120 is secured to or formed integrally with the column 112 and has a bottom 122 and a side wall 124. The barrier container 120 contains repellant 130. A shield 132 extends outwardly from a top column 114 and is configured so that it extends over a circular top opening 121 in the barrier container 120 when the top column 114 has been inserted into and moved down into a channel 113 in the bottom column 112. In this position the shield 132 contacts a top edge 111 of the bottom column 112, rather than the side wall 124 of the barrier container 120, so that ants or other crawling creatures must traverse the repellant 130 to ascend to the tray 126 (which has a raised edge 128). Shield 132 is a circular disc extending about the entire circumference of top column 114.

Figure 5:
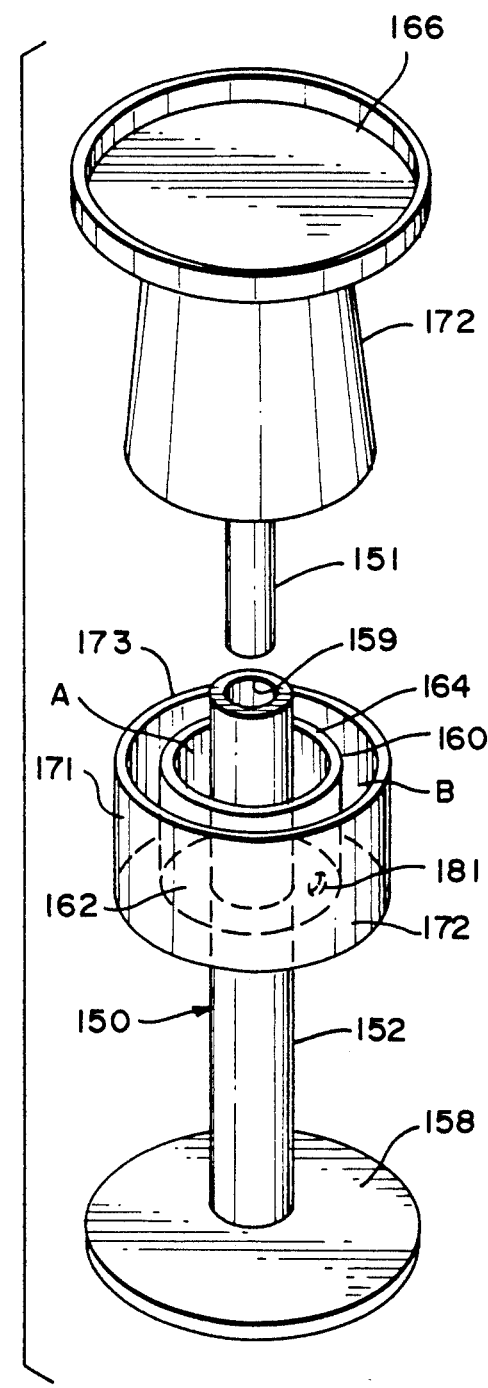
FIG. 5 is a perspective exploded view of a consumables support according to the present invention.

FIG. 5 illustrates a consumables support 150 which is similar to the previously described consumables support 50, but which has a multi-chamber barrier container. A bottom column 152 is connected to a base 158 and has a channel 159 therethrough for receiving a top column 151. A tray 166 is connected to the top column 151 and a shield 172 is connected to the tray 166.

A first barrier container 160 disposed about the bottom column 152 has a bottom 162 and a side wall 164, forming a first repellant container chamber A. A second barrier container 171 is connected to the first barrier container 160 (or may be itself connected to the column 152) and has a bottom 172 and a side wall 173 forming (with the exterior of the side wall 164) a second repellant container chamber B. Via hole 181 in the side wall 164 of barrier container 160, the two chambers A and B are intercommunicating so that fluid material placed in either chamber will flow into the other. It is within the scope of this invention to have two or more non-intercommunicating chambers.

Although only two repellant chambers are shown in FIG. 5, it is within the scope of this invention to provide any desired number of such chambers. Also, although the bottom and top column in FIG. 5 are shown as circular, it is within the scope of this invention to make them of other shapes. When relative up and down movement is desired, the two members will need to be sized or shaped or both to permit such movement; likewise when rotation is desired. This would include, e.g., but not be limited to, a square top column insertable in a square bottom column for relative up-and-down movement (but not for relative rotational movement) or a triangular top column of small enough size that it could not only move up and down in a square bottom column but could rotate in it.

Figure 6:
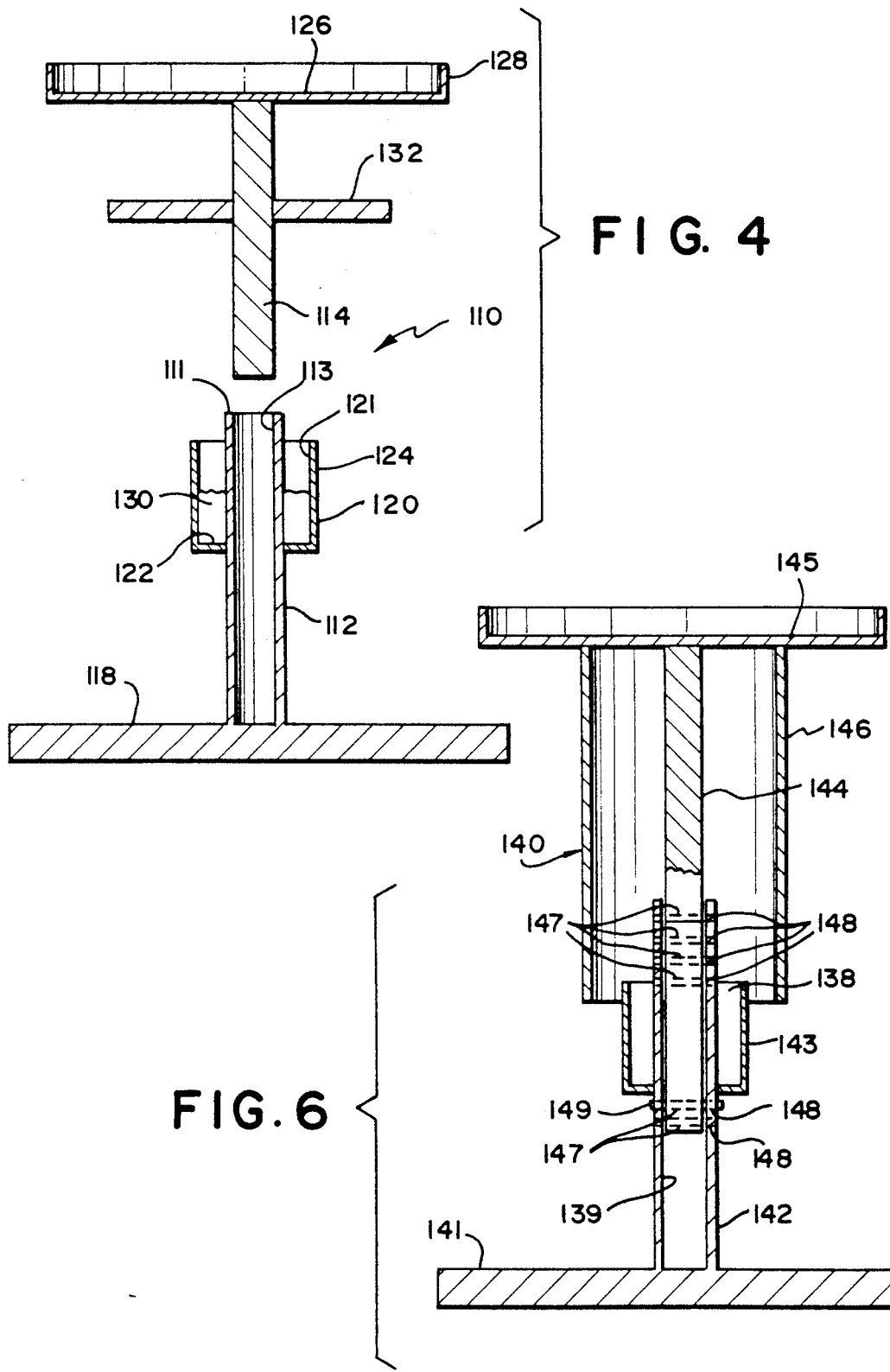
FIG. 6 is a perspective view of a consumables support according to the present invention.

FIG. 6 shows a consumables support 140 according to the present invention having a base 141 to which is connected a bottom column 142 that has a channel 139 therethrough for receiving a top column 144 to which is connected a tray 145. A shield 146 is secured to the tray 145 for shielding an opening 138 of a barrier container 143 disposed on the bottom column 142. The bottom column 142 has a series of holes 148 one of which can be made to correspond to one of a series of holes 147 in top column 144 so that a pin 149 placed through both holes will remain the top column 144 in place in the bottom column 142 thereby maintaining the tray 145 at a desired height.

The barrier container 143 and the shield 146 are made from transparent material so that repellant in the barrier container may be viewed without raising the tray 145. A tube (such as tube 59) can advantageously be used with such an embodiment.

Figure 7:
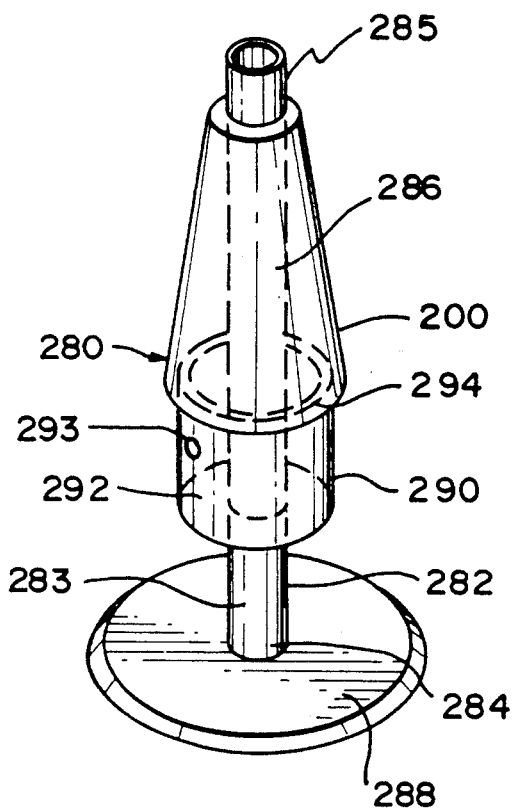
FIG. 7 is a perspective view partially cutaway of a support according to the present invention.

FIG. 7 illustrates an embodiment of a support 280 according to the present invention which has a column 282 with a bottom 283 and a top 285. The column 282 can serve as any of a variety of supports, e.g., but not limited to an extension of a furniture leg. A base 288 is secured to or formed integrally with the column 282. A barrier 290 disposed about the column 282 has a bottom 292 and a side wall 294. An opening 293 in the side wall 294 permits repellant material to pass through, into, or out of the barrier container 290. A shield 200 secured to the column 282 is disposed about the barrier container 290, but does not touch it.

Figure 8:
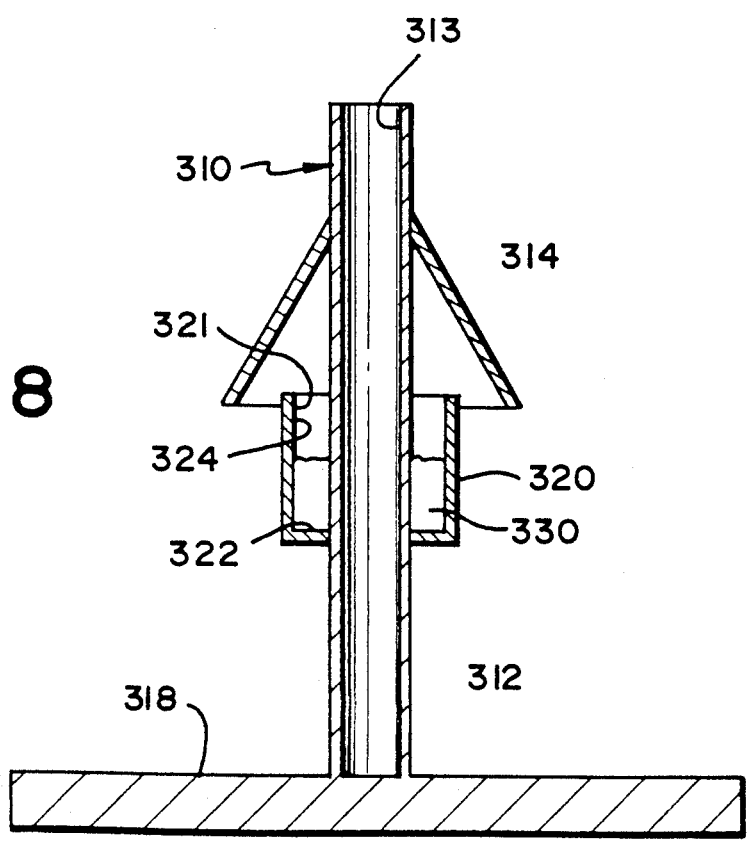
FIG. 8 is a cross-sectional view of a support according to the present invention.

As shown in FIG. 8 a support 310 according to the present invention has a base 318 from which a column 312 extends upwardly. A barrier container 320 is disposed about the column 312 and has a bottom 322 and a side wall 324 and contains repellant material 330. A shield 314 connected to or formed with the column 312 extends outwardly and downwardly so that its lowermost extremity extends downwardly further than an upper edge 321 of the sidewall 324 without contacting it. Of course it is within the scope of this invention to use shields of other shapes, configurations, and dispositions (including but not limited to others discussed above) with the supports 310 and 280. Another support or leg, not shown, can be inserted into a channel 313 in the column 312 so that whatever is supported by the support or leg will benefit from the barrier container 320 and its repellant material.

Supports as disclosed herein may be of any suitable material, including but not limited to plastic, wood, or metal.

In conclusion, therefore, it is seen that the present invention and the embodiments disclosed herein are well adapted to carry out the objectives and obtain the ends set forth at the outset. Certain changes can be made in the method and apparatus without departing from the spirit and the scope of this invention. It is realized that changes are possible and it is further intended that each element or step recited in any of the following claims is to be understood as referring to all equivalent elements or steps for accomplishing substantially the same results in substantially the same or equivalent manner. It is intended to cover the invention broadly in whatever form its principles may be utilized. The present invention is, therefore, well adapted to carry out the objects and obtain the ends and advantages mentioned, as well as others inherent therein.

What is claimed is:

1. A consumables support comprising
a column having a perimeter and a top, a bottom, and a bottom base at the bottom of the column, the column comprising two column members movably disposed with respect to each other, one fitting inside the other,
a tray for the consumables connected to or formed integrally of the top of one of the column members,
transparent barrier container means having a side wall with an upper edge and a top opening defined by the side wall's upper edge, the barrier container means disposed about the perimeter of the column on the column above and apart from the base for containing liquid repellant material for repelling crawling creatures attempting to ascend the column, the barrier container means having an opening through the side wall through which the liquid repellant material may pass, and
the column members having corresponding holes therein through which a pin is insertable to prevent movement of one column member with respect to the other.

2. The consumables support of claim 1 comprising also
a hollow shield disposed on the column for shielding the top opening of the barrier container means, the hollow shield extending downwardly beyond and outside of the upper edge of the side wall of the barrier container means.

3. The consumables support of claim 2 wherein
the shield comprises a cup-shaped member configured to hold therein fumes emitted from the repellant material.

* * * * *